United States Patent
Reagen et al.

(10) Patent No.: US 10,551,130 B2
(45) Date of Patent: Feb. 4, 2020

(54) HEAT TRANSFER TUBE WITH MULTIPLE ENHANCEMENTS

(71) Applicant: Brazeway, Inc., Adrian, MI (US)

(72) Inventors: Scot Reagen, Sylvania, OH (US); Matt Baker, Onsted, MI (US); Dave W. Skrzypchak, Adrian, MI (US); Gary Wolfe, Blissfield, MI (US); Chen-Yu Lin, Toledo, OH (US); Jared Lee Myers, Clayton, MI (US)

(73) Assignee: Brazeway, Inc., Adrian, MI (US)

( * ) Notice: Subject to any disclaimer, the term of this patent is extended or adjusted under 35 U.S.C. 154(b) by 361 days.

(21) Appl. No.: 14/874,708

(22) Filed: Oct. 5, 2015

(65) Prior Publication Data

US 2016/0097604 A1    Apr. 7, 2016

Related U.S. Application Data

(60) Provisional application No. 62/060,051, filed on Oct. 6, 2014.

(51) Int. Cl.
*F28F 1/14* (2006.01)
*F28F 1/40* (2006.01)
*B23P 15/26* (2006.01)

(52) U.S. Cl.
CPC ............... *F28F 1/40* (2013.01); *B23P 15/26* (2013.01)

(58) Field of Classification Search
CPC ............ F28F 1/40; F28F 21/084; B23P 15/26
USPC .......................................................... 165/183
See application file for complete search history.

(56) References Cited

U.S. PATENT DOCUMENTS

| | | | | |
|---|---|---|---|---|
| 4,733,698 A | * | 3/1988 | Sato | F28F 1/40 138/38 |
| 5,052,476 A | * | 10/1991 | Sukumoda | B21B 1/227 138/38 |
| 5,332,034 A | * | 7/1994 | Chiang | F28F 1/40 165/184 |
| 5,458,191 A | * | 10/1995 | Chiang | F28F 1/40 165/133 |
| 5,975,196 A | * | 11/1999 | Gaffaney | F28F 1/40 165/133 |
| 6,026,892 A | * | 2/2000 | Kim | F28F 1/40 165/133 |

(Continued)

FOREIGN PATENT DOCUMENTS

| | | |
|---|---|---|
| CN | 1132850 A | 10/1996 |
| CN | 101180143 A | 5/2008 |

(Continued)

OTHER PUBLICATIONS

Search Report and Written Opinion from corresponding international patent application No. PCT/US2015/054127, dated Jan. 14, 2016.

(Continued)

*Primary Examiner* — Claire E Rojohn, III
(74) *Attorney, Agent, or Firm* — Harness, Dickey & Pierce, P.L.C.

(57) ABSTRACT

A heat transfer tube including an inner surface including a plurality of grooves. The plurality of grooves includes at least primary grooves and secondary grooves, wherein the primary grooves extend axially along a length of the tube, and the secondary grooves intersect the primary grooves.

16 Claims, 5 Drawing Sheets

(56) References Cited

U.S. PATENT DOCUMENTS

| | | | | |
|---|---|---|---|---|
| 6,182,743 | B1* | 2/2001 | Bennett | F28F 1/40 165/133 |
| 6,253,839 | B1* | 7/2001 | Reagen | B21D 53/085 165/150 |
| 6,298,909 | B1* | 10/2001 | Fukatami | F28F 1/40 165/133 |
| 6,336,501 | B1* | 1/2002 | Ishikawa | F28F 1/40 165/133 |
| 6,412,549 | B1 | 7/2002 | Itoh et al. | |
| 6,488,078 | B2* | 12/2002 | Beutler | B21C 37/207 165/133 |
| 7,509,828 | B2* | 3/2009 | Thors | B21C 37/158 408/147 |
| 8,302,307 | B2* | 11/2012 | Thors | B21C 37/20 165/177 |
| 9,188,287 | B2* | 11/2015 | Krautschick | F15D 1/065 |
| 9,234,709 | B2* | 1/2016 | Gotterbarm | B21C 37/207 |
| 9,958,215 | B2* | 5/2018 | Buckrell | F28F 3/027 |
| 2002/0070011 | A1* | 6/2002 | Itoh | F28F 1/40 165/133 |
| 2003/0009883 | A1* | 1/2003 | Thors | F28F 1/40 29/890.03 |
| 2005/0188538 | A1* | 9/2005 | Kondo | B21D 53/085 29/890.044 |
| 2006/0112535 | A1* | 6/2006 | Thors | B21C 37/207 29/557 |
| 2006/0213346 | A1* | 9/2006 | Thors | B21C 37/158 83/178 |
| 2007/0124909 | A1* | 6/2007 | Thors | B21C 37/20 29/428 |
| 2007/0234871 | A1* | 10/2007 | Thors | B21C 37/20 83/875 |
| 2008/0078534 | A1 | 4/2008 | Bunker et al. | |
| 2009/0178432 | A1* | 7/2009 | Reagen | F25B 39/02 62/347 |
| 2010/0193170 | A1* | 8/2010 | Beutler | B21C 37/207 165/181 |
| 2010/0193171 | A1* | 8/2010 | Beppu | B21C 1/24 165/181 |
| 2011/0036553 | A1* | 2/2011 | Christen | F28D 1/0477 165/185 |
| 2016/0097604 | A1* | 4/2016 | Reagen | F28F 1/40 165/183 |
| 2016/0369377 | A1* | 12/2016 | Somani | C22F 1/04 |

FOREIGN PATENT DOCUMENTS

| | | |
|---|---|---|
| EP | 0603108 A1 | 6/1994 |
| EP | 0696718 A1 | 2/1996 |
| JP | H08-075384 A | 3/1996 |
| JP | H10-103887 A | 4/1998 |
| JP | H10166085 A | 6/1998 |
| JP | 2005-315556 A | 11/2005 |
| JP | 2007-225272 A | 9/2007 |
| WO | WO-00/26598 A2 | 5/2000 |

OTHER PUBLICATIONS

Extended European Search Report from corresponding European Patent Application 15849317; dated Apr. 28, 2018; 7 pages.

Notification of First Office Action in corresponding CN Application No. 2015800540820 dated Sep. 18, 2018.

Office Action dated Apr. 3, 2019 against corresponding Japanese Patent Application No. 2017-518355.

Examination Report issued in corresponding IN Application No. 201717012082, dated Aug. 3, 2019.

Office Action dated May 31, 2019 against corresponding Chinese Patent Application No. 201580054082.0.

\* cited by examiner

HEAT TRANSFER TUBE WITH MULTIPLE ENHANCEMENTS

CROSS-REFERENCE TO RELATED APPLICATIONS

This application claims the benefit of U.S. Provisional Application No. 62/060,051, filed on Oct. 6, 2014. The entire disclosure of the above application is incorporated herein by reference.

FIELD

The present disclosure relates to a heat transfer tube including axial and non-axial grooves therein.

BACKGROUND

This section provides background information related to the present disclosure which is not necessarily prior art.

Copper tubing is generally used for condenser tubing in, for example, an air conditioner, refrigerator, or heat pump. While copper provides excellent heat transfer, copper is an expensive material. Thus, materials such as aluminum are now being used to form condenser tubing.

SUMMARY

This section provides a general summary of the disclosure, and is not a comprehensive disclosure of its full scope or all of its features.

The present disclosure provides a heat transfer tube. The heat transfer tube includes an inner surface including a plurality of grooves. The plurality of grooves includes at least primary grooves and secondary grooves, wherein the primary grooves extend along a length of the tube, and the secondary grooves intersect the primary grooves.

The heat transfer tube may include secondary grooves that are helically formed.

The heat transfer tube may also include tertiary grooves that intersect at least the primary grooves.

The tertiary grooves may intersect the secondary grooves.

The tertiary grooves may be helically formed.

The heat transfer tube may include aluminum.

The present disclosure also provides a method of forming a heat transfer tube. The method includes extruding a tube including a plurality of axial primary grooves on an inner surface thereof; and forming a plurality of secondary grooves on the inner surface using a first forming tool, wherein the secondary grooves intersect the primary grooves. In the forming process, the ridges between primary grooves may be deformed to partially or completely block the primary grooves.

The first forming tool may include a plurality of threads at a first pitch and a first height. Alternatively, the first forming tool may include expanding tools or cams that press the secondary grooves into the tube The first forming tool may form the secondary grooves in a helical orientation that may be either continuous or discontinuous, forming discrete rings or other paths.

According to the method, a plurality of tertiary grooves may also be formed on the inner surface using a second forming tool.

The tertiary grooves may intersect the primary grooves.

The tertiary grooves may intersect the secondary grooves.

The second forming tool may include a plurality of threads at a second pitch and a second height and/or a different shape than the first forming tool.

The secondary grooves and the tertiary grooves may each be helically formed.

The method may also include a step of cutting a length of tube from the extruded tube.

The length of tube may be cut from the extruded tube before forming the secondary grooves.

Alternatively, the length of tube may be cut from the extruded tube after forming the secondary grooves.

The method may also include bending the heat transfer tube into a hairpin tube.

According to the method, the heat transfer tube may include aluminum.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
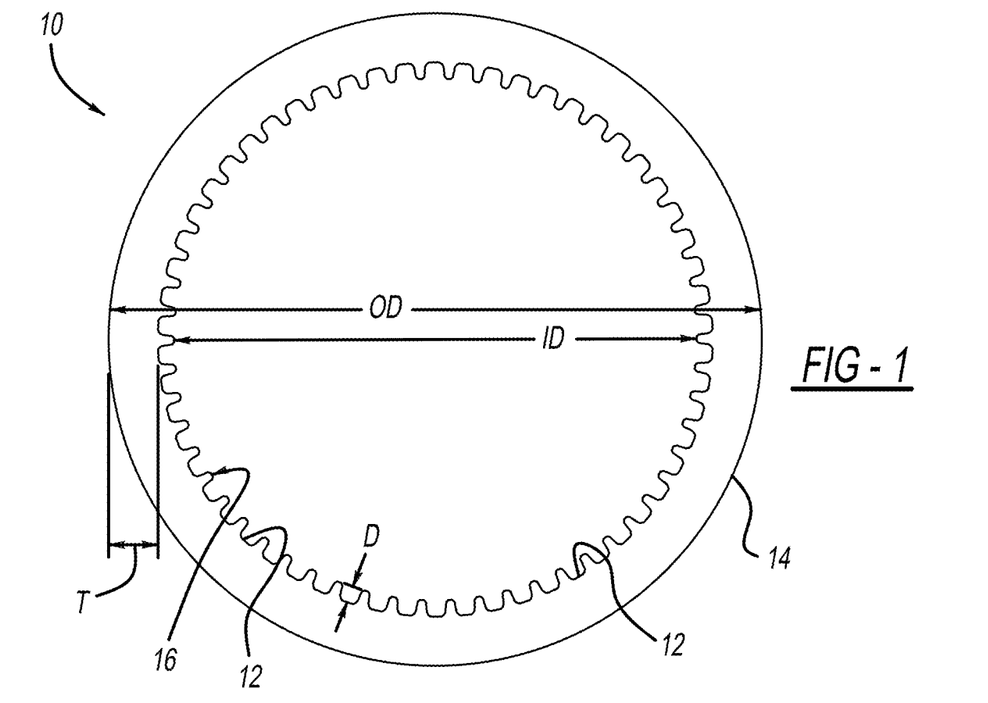
FIG. 1 is a cross-sectional view of an exemplary heat transfer tube according to a principle of the present disclosure.

FIG. 1 illustrates a tube 10 including a plurality of primary grooves 12 separated by ridges 13. Tube 10 is generally cylindrically shaped and includes an outer surface 14 that defines an outer diameter OD, and an inner surface 16 defining an inner diameter ID. Tube 10 may be formed from materials such as copper, aluminum, stainless steel, or any other material known to one skilled in the art. Preferably, tube 10 is used for carrying a refrigerant in an air conditioner condenser, an evaporator, or heat pump.

Tube 10 may be extruded to include primary grooves 12. Primary grooves 12, as illustrated, are axial grooves 12 that assist in increasing the inner surface area of tube 10. It should be understood, however, that primary grooves 12 can be helically formed without departing from the scope of the present disclosure. By increasing the inner surface area of tube 10, a greater amount of heat transfer can occur between the refrigerant carried by tube 10 and tube 10. The number and size of grooves 12 can be variable. As illustrated in FIG. 1, tube 10 includes fifty-eight primary grooves 12. Tube 10, however, can include a greater or less number of primary grooves 12 without departing from the scope of the present disclosure. Further, although primary grooves 12 are illustrated as including a rounded bottom 18, it should be understood that primary grooves 12 can be square-shaped, oval-shaped, or V-shaped without departing from the scope of the present disclosure. Tube 10 has a thickness T in the range of about a third of an inch. Tube 10, however, can have a greater or lesser thickness as desired.

Figure 2:
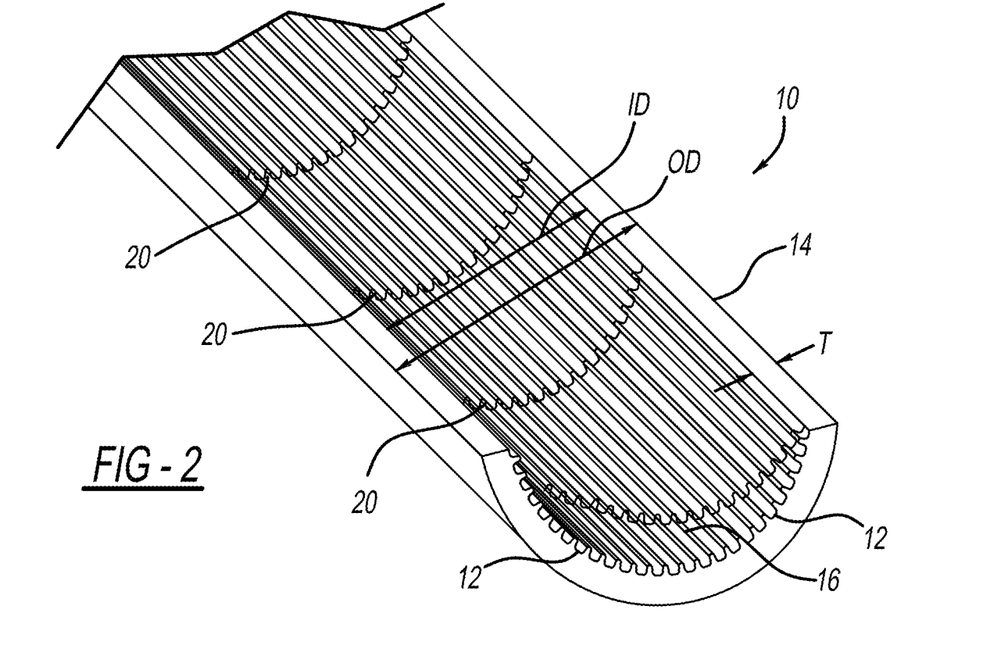
FIG. 2 is a perspective view of a section of an exemplary heat transfer tube according to a principle of the present disclosure.

To further increase the heat transfer capability of tube 10, tube 10 can be further processed to include secondary grooves 20. As illustrated in FIG. 2, secondary grooves 20 are non-axially formed so as to intersect primary grooves 12. The use of secondary grooves 20 along with primary grooves 12 creates a complex inner surface 16 that maximizes heat transfer between the refrigerant carried by tube 10 and tube 10. Secondary grooves 20 may be formed orthogonal to primary grooves 12, or secondary grooves 20 can be helically formed to intersect primary grooves 12. The secondary grooves 20 may be continuously formed or discontinuously formed down the length of the tube 10. The secondary grooves 20 may displace material from the ridges between the primary grooves to form ridges on either or both sides of the secondary grooves that may be continuous or discontinuous in nature to block or restrict the flow fluid in the primary grooves.

Figure 3:
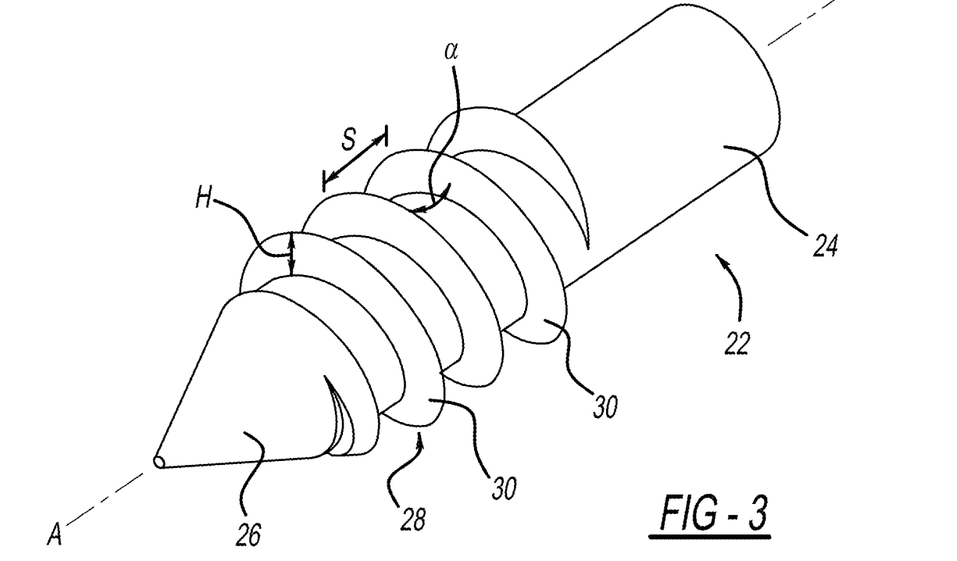
FIG. 3 is a perspective view of a forming tool used to form grooves in a heat transfer tube according to a principle of the present disclosure.
Figure 7:
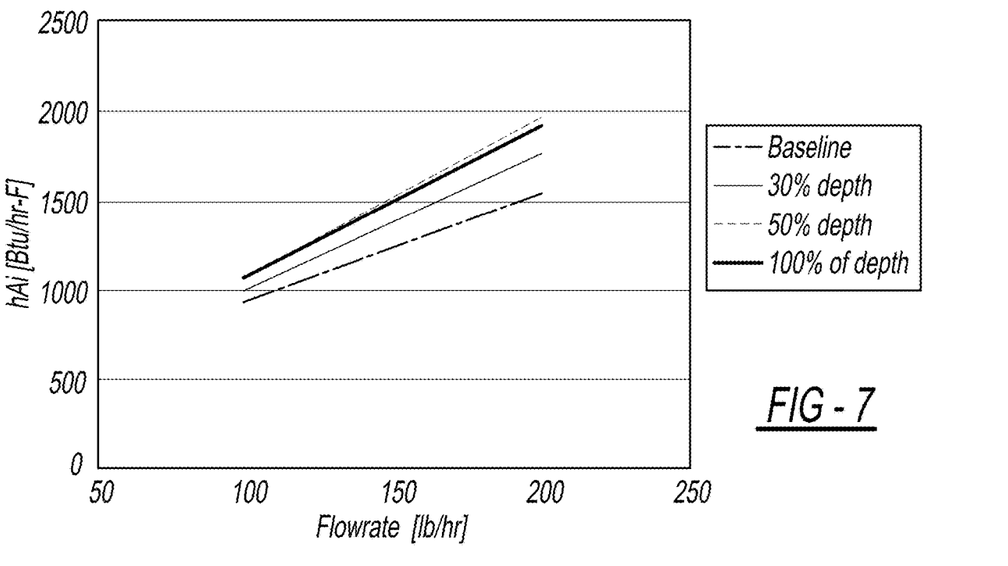
FIG. 7 is a graph illustrating heat transfer results from a 7 mm tube utilizing refrigerant 410a, wherein the secondary grooves have a different depth in comparison to the primary grooves, where the percent depth pertains to the percent the secondary groove cuts into the ridge between the primary grooves (e.g. at 30%, the secondary groove cuts through the top 30% of the ridge, and at 100%, the secondary groove cuts completely through the ridge with both primary and secondary grooves having the same depth)

FIG. 3 illustrates a forming tool 22 that may be used to form secondary grooves 20. Forming tool 22 includes a proximal portion 24 that is driven by a rotating tool (not shown), and forming tool 22 includes a distal portion 26. Distal portion 26 of forming tool 22 also includes a threading 28 that, as forming tool 22 is rotated, will form secondary grooves 20 in tube 10. A pitch or spacing S between threads 30 can be modified, as desired. Further, a height H of threads 30 can be adjusted, as desired. In this regard, height H of threads 30 can be formed greater than, equal to, or less a depth D of primary grooves 12 such that secondary grooves 20 have a different depth (e.g., greater or lesser) in comparison to a depth of primary grooves 12. Differing the depth of secondary grooves 20 can affect heat exchange between the refrigerant and the tube 10. As best shown in FIG. 7, when secondary grooves 20 have a depth that is 30% of the depth of the primary grooves 12, heat transfer is increased. FIG. 7 also shows that secondary grooves 20 that have a depth this 50% or 100% of the depth of the primary grooves 12 also increases heat exchange between the refrigerant and the tube 10.

In addition, an angle α at which threads 30 are arranged relative to an axis A of forming tool 22 can be adjusted as desired. Regardless, it should be understood that each of the spacing S, height H, and angle α can be selected and adjusted based on the inner diameter ID of tube 10, and the desired flow rate of the refrigerant in tube 10. It should also be understood that the secondary grooves 20 may also be formed with a variety of tools that can be placed in the tube to deform the primary grooves, resulting in secondary grooves 20.

Figure 4:
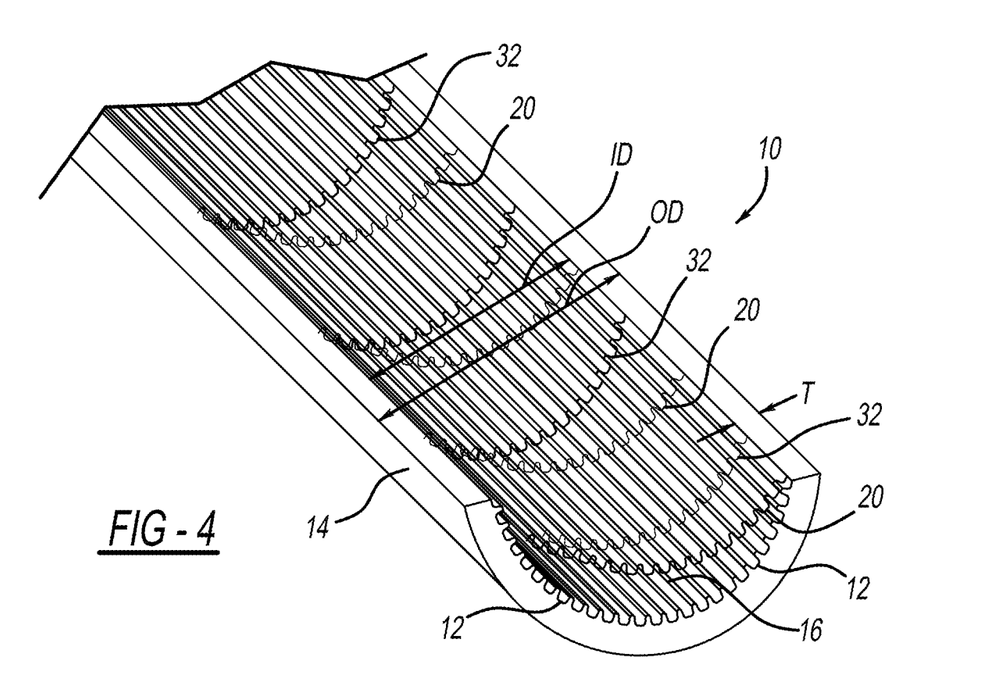
FIG. 4 is a perspective view of a section of another exemplary heat transfer tube according to a principle of the present disclosure.

Now referring to FIG. 4, it can be seen that tube 10 may include primary grooves 12, secondary grooves 20, and tertiary grooves 32. Similar to secondary grooves 20, tertiary grooves 32 are non-axially formed so as to intersect primary grooves 12. Tertiary grooves 32 may also intersect secondary grooves 20. The use of tertiary grooves 32 along with primary grooves 12 and secondary grooves 20 creates a complex inner surface 16 that maximizes heat transfer between the refrigerant carried by tube 10 and tube 10. Tertiary grooves 32 may be formed orthogonal to primary grooves 12, or tertiary grooves 32 can be helically formed to intersect primary grooves 12. Further, tertiary grooves 32 may be formed with a forming tool 22 similar to that used to form secondary grooves 20, with the spacing S, height H, and angle α being differed. The tertiary grooves 32 may have a completely different shape or follow an entirely different path than the primary grooves 12 and secondary grooves 20, and may be continuously formed or discontinuously formed.

Figure 5:
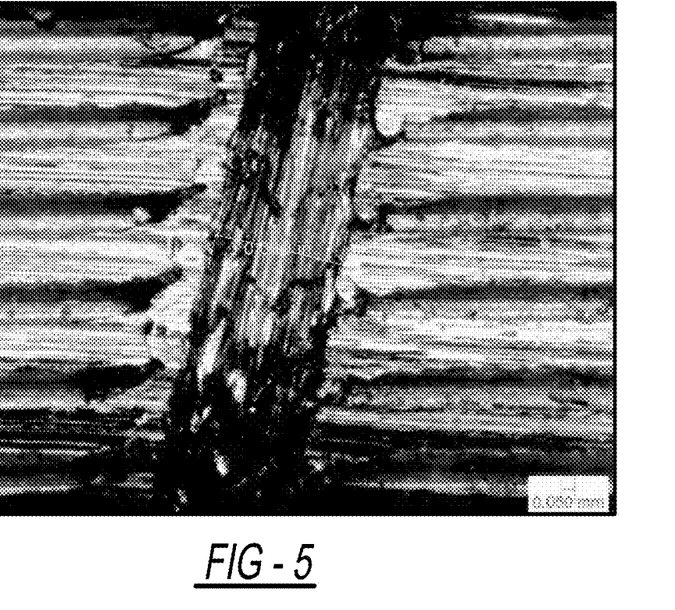
FIG. 5 is a micrograph of a section of an exemplary heat transfer tube according to a principle of the present disclosure, wherein in the process of forming the secondary grooves, the primary grooves are substantially blocked by material deformed from the ridges between primary grooves.
Figure 6:
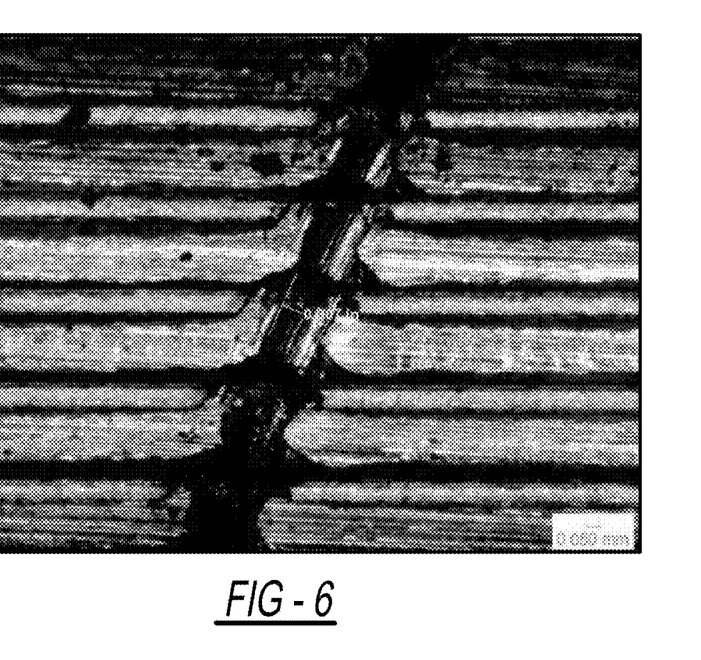
FIG. 6 is a micrograph of a section of an exemplary heat transfer tube according to a principle of the present disclosure, wherein in the process of forming the secondary grooves, the ridges between primary grooves are deformed to protrude into the primary groove without substantially blocking the groove.
Figure 9:
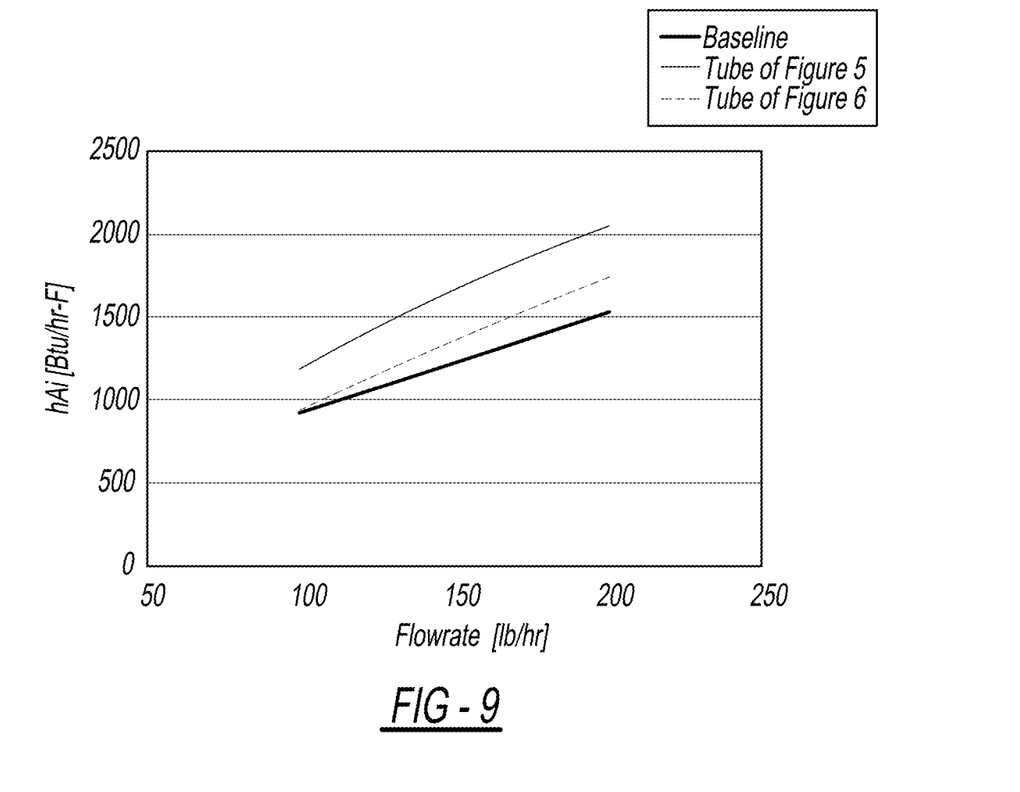
FIG. 9 is a graph illustrating heat transfer results from a 7 mm tube utilizing refrigerant 410a, wherein a tube including primary grooves is compared to the tube illustrated in FIG. 5, and compared to the tube illustrated in FIG. 6.

Now referring to FIGS. 5 and 6, it can be seen that primary grooves 12 (which travel from left to right in FIGS. 5 and 6) may be entirely blocked (FIG. 5) or partially blocked (FIG. 6) by formation of the secondary grooves 20 and/or the tertiary grooves 32. In this regard, tool 22 used to form second grooves 20 and/or tertiary grooves 32 can deform ridges 13 between primary grooves 12 during formation of the secondary grooves 20 and/or the tertiary grooves 32 such that portions of ridges 13 are deformed or forced into primary grooves 12. By forcing the ridges 13 into primary grooves 12, heat transfer between the refrigerant and the tube 10 is increased due to restriction of the flow in primary grooves 12, which increases turbulence in the flow of the refrigerant in tube 10. This heat transfer effect is most pronounced when the ridges 13 between the primary groves 12 are deformed to completely block or restrict the flow in the primary groove 12. It should be understood, however, that partial blockage of primary groove 12 by deformed portions also achieves an increase in heat transfer between tube 10 and the refrigerant (FIG. 9).

Figure 8:
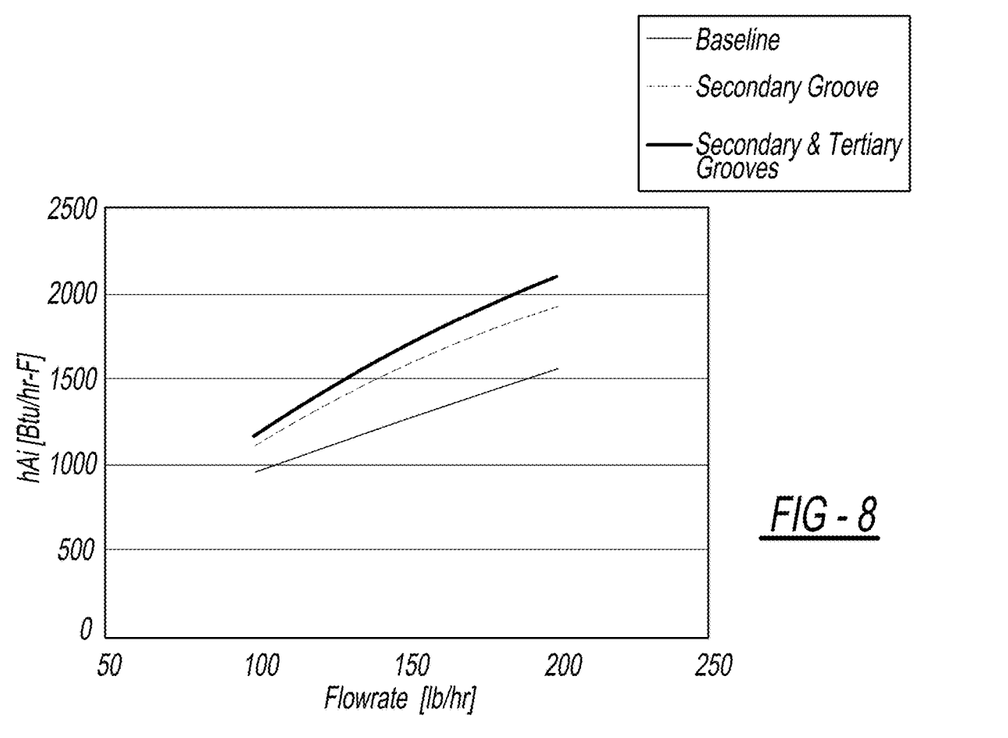
FIG. 8 is a graph illustrating heat transfer results from a 7 mm tube utilizing refrigerant 410a, wherein a tube including primary grooves is compared to a tube including primary grooves and secondary grooves, and compared to a tube including primary grooves, secondary grooves, and tertiary grooves.

The use of secondary grooves 20 and/or tertiary grooves 32 assists in improving the heat transfer characteristics of tube 10 as much as 30% in comparison to a tube 10 including only axial grooves (FIG. 8). In this regard, in a conventional tube including only axial grooves, the refrigerant flow tends to settle into and follow the axial grooves, which forms a refrigerant boundary layer within the tube that resists and/or restricts heat transfer between the refrigerant and the tube.

The use of secondary grooves 20 and/or tertiary grooves 32 disrupts the flow of the refrigerant through primary grooves 12 to prevent formation of a refrigerant boundary layer. In this regard, the flow of the refrigerant is disrupted by the intersection of the primary grooves 12 by each of the secondary grooves 20 and/or the tertiary grooves 32, which causes the refrigerant flow to break off from primary grooves 20 and also creates turbulence in the refrigerant flow that enhances heat transfer.

To form tube 10, a length of tube (e.g., 500 feet) is extruded to include primary grooves 12. A desired length of tube 10 is selected, and the desired length is cut from the length of tube. A secondary process is then conducted to form secondary grooves 20 and/or tertiary grooves 32. Specifically, a forming tool 22 is selected having the desired spacing S, height H, and angle α of threads 30. Forming tool 22 is inserted into tube 10 and rotated to form secondary grooves 20 and/or tertiary grooves 32. A single pass of multiple forming tools 22, or multiple passes of multiple forming tools 22 can be done to form secondary and/or tertiary grooves 20 and 32. Thus, it should be understood that tube 10 can also include any number of grooves (not shown), etc.

After forming at least the secondary grooves 20, the tube 10 may then be bent into a desired configuration (e.g., a hairpin). Alternatively, tube 10 may be bent into the desired configuration prior to forming secondary and/or tertiary grooves 20 and 32. In addition, it should be understood that the second processing can occur before or after tube 10 is cut from the length of tube, and before or after lubricant is applied to tube 10 that is used during expansion of tube 10.

Alternatively, the secondary grooves 20 may formed in a continuous fashion (e.g. drawing) before cutting the tube 10 to final length. The forming tool may be designed in a way that the tool is self-rotating in the continuous process, simplifying the process. The continuous process may be performed in conjunction with other existing processes, such as extrusion or cutting, or performed as a standalone coil to coil operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heat transfer tube, comprising an inner surface including a plurality of grooves, the plurality of grooves including at least primary grooves and secondary grooves,
   wherein the primary grooves each extend in an axial direction along and defined by a length of the tube and are open in a radial direction toward a center of the tube, adjacent primary grooves being separated by a ridge,
   the secondary grooves intersect the primary grooves, and
   at locations where the secondary grooves intersect the primary grooves, each of the primary grooves are entirely blocked in the axial direction of the tube without being blocked in the radial direction by a material of the ridge that separates the adjacent primary grooves that is deformed into one of the adjacent primary grooves.

2. The heat transfer tube of claim 1, wherein the secondary grooves are helically formed.

3. The heat transfer tube of claim 1, further comprising tertiary grooves that intersect at least the primary grooves.

4. The heat transfer tube of claim 3, wherein the tertiary grooves intersect the secondary grooves.

5. The heat transfer tube of claim 4, wherein the tertiary grooves are helically formed.

6. The heat transfer tube according to claim 1, wherein the heat transfer tube includes aluminum.

7. The heat transfer tube according to claim 1, wherein at the locations where the secondary grooves intersect the primary grooves, each of the deformations of the ridges that separate adjacent primary grooves are oriented in a same direction.

8. The heat transfer tube according to claim 1, wherein a depth of the secondary grooves is greater than a depth of the primary grooves.

9. A heat transfer tube, comprising an inner surface including a plurality of grooves, the plurality of grooves including at least primary grooves and secondary grooves,
   wherein the primary grooves each extend in an axial direction along and defined by a length of the tube and are open in a radial direction toward a center of the tube, adjacent primary grooves being separated by a ridge,
   the secondary grooves intersect the primary grooves, and
   at locations where the secondary grooves intersect the primary grooves, each of the primary grooves are at least partially blocked in the axial direction of the tube without being blocked in the radial direction by a material of the ridge that separates adjacent primary grooves that is deformed into one of the adjacent primary grooves.

10. The heat transfer tube according to claim 9, wherein a depth of the secondary grooves is greater than a depth of the primary grooves.

11. The heat transfer tube according to claim 9, wherein each of the primary grooves are entirely blocked in the axial direction of the tube without being blocked in the radial direction by the deformation of the ridge that separates the adjacent primary grooves.

12. A heat transfer tube, comprising an inner surface including a plurality of grooves, the plurality of grooves including at least primary grooves and secondary grooves,
    wherein the primary grooves each extend axially along a length of the tube and are open in a radial direction toward a center of the tube,
    the secondary grooves intersect the primary grooves,
    at locations where the secondary grooves intersect the primary grooves, each of the primary grooves are at least partially blocked in an axial direction of the tube without being blocked in the radial direction by a deformation of a ridge that separates adjacent primary grooves, and
    a depth of the secondary grooves is greater than a depth of the primary grooves.

13. The heat transfer tube according to claim 12, wherein each of the primary grooves are entirely blocked in the axial direction of the tube without being blocked in the radial direction by the deformation of the ridge that separates the adjacent primary grooves.

14. The heat transfer tube according to claim 12, wherein at the locations where the secondary grooves intersect the primary grooves, each of the deformations of the ridges that separate adjacent primary grooves are oriented in a same direction.

15. The heat transfer tube according to claim 1, wherein the material of the ridge that is deformed into one of the adjacent primary grooves restricts flow through the one primary groove.

16. The heat transfer tube according to claim 9, wherein the material of the ridge that is deformed into one of the adjacent primary grooves restricts flow through the one primary groove.

* * * * *